US011365283B2

United States Patent
Kopczynski et al.

(10) Patent No.: US 11,365,283 B2
(45) Date of Patent: Jun. 21, 2022

(54) EPOXY RESIN-BASED FIBRE MATRIX COMPOSITIONS CONTAINING ALKYL-SUBSTITUTED ETHYLENE AMINES

(71) Applicant: BASF SE, Ludwigshafen am Rhein (DE)

(72) Inventors: Matthaeus Kopczynski, Ludwigshafen (DE); Ansgar Gereon Altenhoff, Ludwigshafen (DE); Dieter Kolassa, Ludwigshafen (DE); Hannes Ferdinand Zipfel, Ludwigshafen (DE); Christian Eidamshaus, Ludwigshafen (DE); Joerg Pastre, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/603,656

(22) PCT Filed: Apr. 9, 2020

(86) PCT No.: PCT/EP2020/060220
§ 371 (c)(1),
(2) Date: Oct. 14, 2021

(87) PCT Pub. No.: WO2020/212258
PCT Pub. Date: Oct. 22, 2020

(65) Prior Publication Data
US 2022/0145001 A1 May 12, 2022

(30) Foreign Application Priority Data
Apr. 18, 2019 (EP) .................................. 19170220

(51) Int. Cl.
C08G 59/50 (2006.01)
C08J 5/24 (2006.01)

(52) U.S. Cl.
CPC .......... *C08G 59/5006* (2013.01); *C08J 5/243* (2021.05); *C08J 5/244* (2021.05); *C08J 5/247* (2021.05); *C08J 2363/00* (2013.01)

(58) Field of Classification Search
CPC ... C08L 63/00; C08J 2363/00; C08J 2363/02; C08J 2363/10; C08J 5/04; C08J 5/043; C08J 5/044; C08J 5/047; C08J 5/042; C08J 5/24; C08G 59/50; C08G 59/5006; E04C 5/07; C04B 20/1037; C04B 32/02; C04B 14/386; C04B 14/42; C04B 16/06; C04B 26/14

USPC ......... 564/511, 512; 528/120, 123; 525/504; 252/182.13; 428/292.4, 413
See application file for complete search history.

(56) References Cited

U.S. PATENT DOCUMENTS

| 4,608,300 | A | 8/1986 | Gruber |
| 5,618,905 | A | 4/1997 | Marsella et al. |
| 2011/0028603 | A1 | 2/2011 | Peretolchin et al. |
| 2011/0130524 | A1 | 6/2011 | Wittenbecher et al. |
| 2018/0127980 | A1* | 5/2018 | Fuchsmann .............. C08J 5/043 |

FOREIGN PATENT DOCUMENTS

| DE | 69629616 | 6/2004 |
| EP | 0133154 | 2/1985 |
| EP | 2307358 A1 | 4/2011 |
| WO | WO-2010/010045 A1 | 1/2010 |
| WO | WO-2016/177533 A1 | 11/2016 |

OTHER PUBLICATIONS

International Search Report dated Jun. 2, 2020 in PCT/EP2020/060220, with English translation, 5 pages.
Written Opinion dated Jun. 2, 2020 in PCT/EP2020/060220, with English translation, 8 pages.
Akhmadeyeva, et al., "The Creation and Development Prospects for the Production of Propylene Diamines and Polypropylene Polyamines", Corporation Kaustik Tekhnicheskaya, Mar. 25-28, 2003, with English translation, pp. 473-475.
Burton, et al., "4. The Jeffamine PEA as Epoxy Curing Agents", Epoxy Formulations using Jeffamine Polyetheramines—Huntsman, Apr. 27, 2005, pp. 7-14.
European Search Report for EP Patent Application No. 19170220.8, dated Sep. 18, 2019, 3 pages.
Lee, et al., "Chapter 12: Acid-Anhydride Curing Agents for Epoxy Resins", Handbook of Epoxy Resins, 1967, pp. 12-(36-37).
Pham, et al., "Epoxy Resins", Ullmann's Encyclopedia of Industrial Chemistry, ed. Ley, et al., vol. 13, Oct. 15, 2005, pp. 155-244.

* cited by examiner

*Primary Examiner* — Camie S Thompson
(74) *Attorney, Agent, or Firm* — Grüneberg and Myers PLLC

(57) ABSTRACT

Epoxy resin-based fibre matrix compositions contain alkyl substituted ethylene amines such as dimethyldiethylenetriamine (DMDETA, also dimethyl-1,4,7-triazaheptane), as a curing agent. These curing agents are characterized by a short curing time for a comparatively long processing time, and make it possible to obtain cured epoxy resins that exhibit low brittleness and high tensile strength and have a high glass transition temperature; as a result of which the fibre matrix composition is suitable particularly for use in pultrusion and winding processes.

20 Claims, No Drawings

EPOXY RESIN-BASED FIBRE MATRIX COMPOSITIONS CONTAINING ALKYL-SUBSTITUTED ETHYLENE AMINES

CROSS-REFERENCE TO RELATED APPLICATIONS

This application is the National Stage entry under § 371 of International Application No. PCT/EP2020/060220, filed on Apr. 9, 2020, and which claims the benefit of priority to European Application No, 19170220.8, filed on Apr. 18, 2019. The content of each of these applications is hereby incorporated by reference in its entirety.

BACKGROUND OF THE INVENTION

Field of the Invention

The present invention relates to epoxy resin-based fiber-matrix compositions comprising alkyl-substituted ethyleneamines, for example dimethyldiethylenetriamine (DM-DETA, also dimethyl-1,4,7-triazaheptane), as curing agent. The invention further relates to methods of producing cured composite materials from the fiber-matrix composition, especially pultrusion and filament winding methods, and to the cured composite materials obtainable thereby.

Epoxy resins are common knowledge and on account of their toughness, flexibility, adhesion and chemicals resistance are used as materials for surface coating, as adhesives and for molding and laminating, and for producing fiber-reinforced composite materials.

Proceeding from epoxy compounds having at least two epoxy groups, curing is possible, for example, with an amino compound having two amino groups by a polyaddition reaction (chain extension). Amino compounds having high reactivity are generally added only shortly before the desired curing. Such systems are therefore called two-component systems (2K systems).

In principle, aminic curing agents (amino curing agents) are classified according to their chemical structure into aliphatic, cycloaliphatic or aromatic types. In addition, classification is possible by the degree of substitution of the amino group, which may be primary, secondary or else tertiary. For tertiary amines, however, a catalytic mechanism of curing of epoxy resins is postulated, whereas the basis for the formation of the polymer network for secondary and for primary amines is stoichiometric curing reactions.

In general, it has been shown that aliphatic amines show the highest reactivity among the primary amino curing agents in epoxy curing. Somewhat slower reaction is typically exhibited by cycloaliphatic amines, whereas aromatic amines (amines where the amino groups are bonded directly to a carbon atom of the aromatic ring) have by far the lowest reactivity.

These known differences in reactivity are utilized in the curing of epoxy resins in order to be able to adjust the processing time and curing rate as required. For the production of fiber-reinforced composite materials (composites), it is desirable when the epoxy resin composition (matrix component) used for embedding or impregnation of the reinforcing fibers has a very long processing time (pot life: period within which the composition can be processed). In the production of composites by means of pultrusion methods or by infusion or injection methods such as vacuum-assisted resin transfer molding (VARTM) or resin transfer molding (RTM), a sufficiently long processing time is required for the matrix component to efficiently wet the reinforcing fibers and to be distributed homogeneously around the reinforcing fibers, especially in the production of large components. For the same reason, a low mixed viscosity of the matrix component is also desirable. At the same time, the matrix component is to cure within an acceptable period of time at elevated temperature in order to enable short production cycles and hence high productivity.

Cycloaliphatic amines, for example isophoronediamine (IPDA), enable a comparatively long processing time and, given suitable formulation, simultaneously also a high curing rate and low mixed viscosity (Ullmann's Encyclopedia of Industrial Chemistry, Wiley-VCH, Weinheim, Germany, 2012, Vol. 13, Epoxy Resins, H. Pham & M. Marks, chpt. 15:1.1.2, Tab. 14 (online: 15.10.2005, DOI: 10.1002/14356007.a09_547.pub2)). Moreover, epoxy resins that have been cured with cycloaliphatic amines such as IPDA are generally notable for a high glass transition temperature. Therefore, cycloaliphatic amines are also used especially for the production of composites. Aromatic amines and anhydrides that are likewise used in the production of composites have the disadvantage that long curing times and high curing temperatures are required. Moreover, curing with anhydrides generally leads to comparatively brittle resins. EP2307358 A states that adding tetramethylguanidine in epoxy resin curing with IPDA and D230 polyetheramine can simultaneously prolong pot life and increase curing rate. However, the systems described therein have comparatively low glass transition temperatures.

Particular demands on the curable composition are made by the production of composites by means of pultrusion methods. In the pultrusion method, bundles of long fibers (for example glass, carbon or aramid fibers), in a continuous process, are pulled through a device in which the fiber bundles are first impregnated with a curable composition (matrix component) and then cured at elevated temperature to give the composite component (pultrusion profiles). Matrix components used are generally curable compositions based on polyester resins or epoxy resins. The fibers can be impregnated, for example, by pulling the fibers through a bath containing the matrix component (bath method or "resin bath-based pultrusion"), or by injecting the matrix component under pressure between the fibers (injection method or "resin-injection pultrusion"). For curing and shaping, the impregnated fiber strand is pulled through a heating zone where the matrix component cures at temperatures in the range from 100 to 200° C. For the pultrusion method, the matrix component must firstly have a sufficiently long pot life for the performance of the impregnation step, but must secondly also cure rapidly at elevated temperature. The curing rate limits the speed at which the fiber strand can be pulled through the heating zone, and hence the throughput of the method. In practice, matrix components used are typically epoxy resin systems based on an anhydride as curing agent in combination with an accelerator (for example imidazoles or tertiary amines) (described, for example, in technical data sheets published by Huntsman in 2012 relating to mixtures of Araldite® LY 1564 (mixture of bisphenol A epoxy resin and butanediol diglycidyl ether reactive diluent), Aradur® 917 (mixture of 4-methyltetrahydrophthalic anhydride and tetrahydrophthalic anhydride) and Accelerator 960-1 (2,4,6-tris(dimethylaminomethyl)phenol) or to mixtures of Araldite® LY 1556 (bisphenol A epoxy resin), Aradur® 917 and Accelerator DY 070 (1-methylimidazole)). Disadvantageously, anhydride curing of epoxy resins, by contrast with amino curing, results in comparatively brittle products (Lee & Neville, Handbook of Epoxy Resins (1967), pp. 12-36ff).

Description of Related Art

WO2016/177533 describes a pultrusion method for production of rebars having a matrix component composed of epoxy resin and amino curing agent, for example IPDA. The use of IPDA rather than an anhydride curing agent accordingly achieves improved alkali stability and a higher glass transition temperature. Pot life in the case of IPDA-based epoxy resin systems is distinctly shorter than that of systems based on anhydride curing agents, but is sufficient for use in the pultrusion method.

Against this background, therefore, particularly for the pultrusion method, there is a search for epoxy resin-based fiber-matrix compositions with amino curing agents which, like the epoxy resin systems with the known cycloaliphatic amino curing agent IPDA, feature comparatively long pot life and low mixed viscosity at room temperature (23° C.), and lead to cured epoxy resins having high glass transition temperature and good mechanical properties (such as low brittleness in particular), but simultaneously enable relatively high curing rates at moderate curing temperatures, for example 70 to 180° C., especially 90 to 150° C.

SUMMARY OF THE INVENTION

It is an object of the invention, especially for the pultrusion method, to provide such epoxy resin-based fiber-matrix compositions having improved curing rate at moderate curing temperatures of 70 to 180° C., especially 90 to 150° C., with simultaneously comparatively long pot life and low mixed viscosity at room temperature. The composition should preferably enable similarly high glass transition temperatures and good mechanical properties (especially low brittleness) for the cured resin to the composition composed of epoxy resin and the cycloaliphatic amino curing agent IPDA.

In the context of this invention, it has been found that the use of alkyl-substituted ethyleneamines, for example dimethyldiethylenetriamine (DMDETA), even though it is structurally an aliphatic amine, has a pot life and mixed viscosity at room temperature that are comparable to the cycloaliphatic amino curing agent IPDA, and leads to a cured epoxy resin that has similar glass transition temperature and similarly good mechanical properties, but at the same time cures particularly rapidly at a moderate curing temperature of 70 to 180° C., especially 90 to 150° C., and hence is of particularly good suitability for use in the pultrusion method. Alkyl-substituted ethyleneamines, for example DMDETA, unexpectedly combine the rapid curing that is typical of aliphatic amines with the relatively long pot lives and relatively high glass transition temperatures that are typical of cycloaliphatic amines.

The present invention accordingly relates to a fiber-matrix composition having a fiber component consisting of reinforcing fibers and a matrix component comprising epoxy resin and curing agent, characterized in that the curing agent comprises at least one alkyl-substituted ethyleneamine of the formula I $$H_2N-A-(NH-A-)_nNH_2 \quad (1)$$

for example dimethyldiethylenetriamine (DMDETA), where A is independently an ethylene group of the formula —CHR—CH$_2$— or —CFH—CHR—, with R=H, ethyl or methyl, but at least one A of the alkyl-substituted ethyleneamine of the formula I is an alkylethylene group of the formula —CHR—CH$_2$— or —CH$_2$—CHR—, with R=ethyl or methyl, and where n=1 to 4, preferably n=1 or 2, especially n=1.

DETAILED DESCRIPTION OF THE INVENTION

In a preferred embodiment, the alkyl-substituted ethyleneamine of the invention is a compound of the formula I where A is independently a methylethylene group of the formula —CH(CH$_3$)—CH$_2$— or —CH$_2$—CH(CH$_3$)—, and where n=1 to 4, preferably n=1 or 2.

In a particularly preferred embodiment, the alkyl-substituted ethyleneamine of the invention is dimethyldiethylenetriamine (DMDETA), a compound of the formula II or isomer mixture of multiple compounds of the formula II, $$H_2N\text{-}A\text{-}NH\text{-}A\text{-}NH_2 \quad (II)$$

where A is independently a methylethylene group of the formula

—CH(CH$_3$)—CH$_2$— or —CH$_2$—CH(CH$_3$)—.

Preferably, the DMDETA of the invention is an isomer of the formula IIa, IIb or IIc, or a mixture of the isomers of the formulae IIa, IIb and IIc (or a mixture of two of these three isomers),

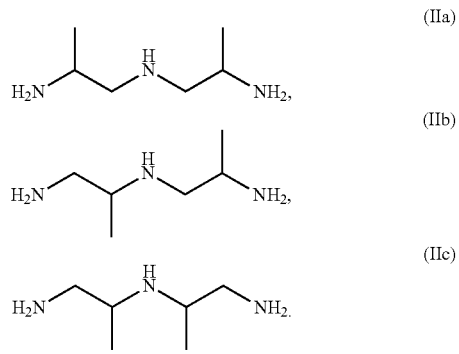

In the inventive use of DMDETA isomer mixtures, especially mixtures consisting essentially of the compounds of the formulae IIa and IIb are used. These mixtures consist, for example, to an extent of at least 60% by weight, especially to an extent of at least 80% by weight, of the compounds of the formulae IIa and IIb.

The empiric amine hardener equivalent weight (AHEW$_{emp}$) of the DMDETA of the invention is preferably in the range from 25 to 30 g/eq.

The fundamental usability of DMDETA as curing agent for epoxy resins was mentioned by Akhmadeyeva and Zagidullin (edited by Mukmeneva, Materialy Yubileinoi Nauchno-Metodicheskoi Konferentsii "III Kirpichnikovskie Chteniya", Kazan, Russian Federation, Mar. 25-28, 2003, p. 473-475), without going into any detail.

Epoxy resins according to the present invention typically have 2 to 10, preferably 2 to 6, even more preferably 2 to 4, and especially 2 epoxy groups. The epoxy groups are especially glycidyl ether groups as formed in the reaction of alcohol groups with epichlorohydrin. The epoxy resins may be low molecular weight compounds generally having an average molar weight (M$_n$) of less than 1000 g/mol, or higher molecular weight compounds (polymers). Such polymeric epoxy resins preferably have a degree of oligomerization of 2 to 25, more preferably of 2 to 10, units. Said resins may be aliphatic or cycloaliphatic compounds or compounds having aromatic groups. In particular, the epoxy resins are compounds having two aromatic or aliphatic 6-membered rings or oligomers thereof. Epoxy resins of industrial importance are those obtainable by reaction of epichlorohydrin with compounds having at least two reactive hydrogen atoms, especially with polyols. Of particular importance are epoxy resins obtainable by reaction of epichlorohydrin with compounds comprising at least two, preferably two, hydroxy groups and two aromatic or aliphatic 6-membered rings. Such compounds especially include bisphenol A and bisphenol F, and also hydrogenated bisphenol A and bisphenol F, the corresponding epoxy resins being the diglycidyl ethers of bisphenol A or bisphenol F, or of hydrogenated bisphenol A or bisphenol F. The epoxy resin used according to the present invention is typically bisphenol A diglycidyl ether (DGEBA). Suitable epoxy resins according to the present invention also include tetraglycidyl-methylenedianiline (TGMDA) and triglycidylaminophenol or mixtures thereof. Also suitable are reaction products of epichlorohydrin with other phenols, for example with cresols or phenol-aldehyde adducts, such as phenol-formaldehyde resins, especially novolacs. Epoxy resins not derived from epichlorohydrin are also suitable. Examples of useful resins include epoxy resins comprising epoxy groups via reaction with glycidyl (meth)acrylate. Preference is given in accordance with the invention to using epoxy resins or mixtures thereof that are liquid at room temperature (23° C.). The epoxy equivalent weight (EEW) gives the average mass of the epoxy resin in g per mole of epoxy group.

The matrix component of the fiber-matrix composition of the invention preferably consists to an extent of at least 50% by weight of epoxy resin.

In a particular embodiment, the fiber-matrix composition of the invention may additionally comprise reactive diluents. Reactive diluents in the context of the invention are compounds which reduce the mixed viscosity (also initial viscosity) of the curable composition and which, in the course of the curing of the curable composition, form a chemical bond with the developing network of epoxy resin and curing agent. Preferred reactive diluents in the context of the present invention are low molecular weight organic, preferably aliphatic, compounds comprising one or more epoxy groups.

Reactive diluents of the invention are preferably selected from the group consisting of butane-1,4-diol bisglycidyl ether, hexane-1,6-diol bisglycidyl ether (HDDE), glycidyl neodecanoate, glycidyl versatate, 2-ethylhexyl glycidyl ether, neopentyl glycol diglycidyl ether, p-tert-butyl glycidyl ether, butyl glycidyl ether, C8-C10-alkyl glycidyl ethers, C12-C14-alkyl glycidyl ethers, nonylphenyl glycidyl ether, p-tert-butylphenyl glycidyl ether, phenyl glycidyl ether, o-cresyl glycidyl ether, polyoxypropylene glycol diglycidyl ether, trimethylolpropane triglycidyl ether (TMP), glycerol triglycidyl ether, triglycidylparaaminophenol (TGPAP), divinylbenzyl dioxide and dicyclopentadiene diepoxide. They are more preferably selected from the group consisting of butane-1,4-diol bisglycidyl ether, hexane-1,6-diol bisglycidyl ether (HDDE), 2-ethylhexyl glycidyl ether, C8-C10-alkyl glycidyl ethers, C12-C14-alkyl glycidyl ethers, neopentyl glycol diglycidyl ether, p-tert-butyl glycidyl ether, butyl glycidyl ether, nonylphenyl glycidyl ether, p-tert-butylphenyl glycidyl ether, phenyl glycidyl ether, o-cresyl glycidyl ether, trimethylolpropane triglycidyl ether (TMP), glycerol triglycidyl ether, divinylbenzyl dioxide and dicyclopentadiene diepoxide. They are especially selected from the group consisting of butane-1,4-diol bisglycidyl ether, C8-C10-alkyl monoglycidyl ethers, C12-C14-alkyl monoglycidyl ethers, hexane-1,6-diol bisglycidyl ether (HDDE), neopentyl glycol diglycidyl ether, trimethylolpropane triglycidyl ether (TMP), glycerol triglycidyl ether and dicyclopentadiene diepoxide.

The reactive diluents of the invention preferably account for a proportion up to 30% by weight, more preferably up to 25% by weight, especially from 1% to 20% by weight, based on the amount of epoxy resin.

The curing agent of the matrix component of the invention may, as well as the alkyl-substituted ethyleneamine of the invention, also comprise further aliphatic, cycloaliphatic and aromatic polyamines or further primary monoamines. Examples of suitable additional aliphatic, cycloaliphatic or aromatic polyamines include dicyan, dimethyldicyan (DMDC), isophoronediamine (IPDA), diethylenetriamine (DETA), triethylenetetramine (TETA), tetraethylenepentamine (TEPA), 1,3-bis(aminomethyl)cyclohexane (1,3-BAC), bis(p-aminocyclohexyl)methane (PALM), methylenedianiline (for example 4,4'-methylenedianiline), polyetheramines, such as D230 polyetheramine, D400 polyetheramine, D2000 polyetheramine or T403 polyetheramine, 4,9-dioxadodecane-1,12-diamine (DODA), 4,7,10-trioxatridecane-1,13-diamine (TTD), polyaminoamides such as Versamid 140, diaminodiphenylmethane (DDM), diaminodiphenyl sulfone (DDS), toluene-2,4-diamine, toluene-2,6-diamine, 4-methylcyclohexane-1,3-diamine, 2-methylcyclohexane-1,3-diamine, mixtures of 4-methylcyclohexane-1,3-diamine and 2-methylcyclohexane-1,3-diamine (MCDA), 1,2-diaminocyclohexane (DACH), 2,4-diamino-3,5-diethyltoluene, 2,6-diamino-3,5-diethyltoluene (DETDA), 1,2-diaminobenzene, 1,3-diaminobenzene, 1,4-diaminobenzene, diaminodiphenyl oxide, 3,3',5,5'-tetramethyl-4,4'-diaminodiphenyl, 3,3'-dimethyl-4,4'-diaminodiphenyl, 1,12-diaminododecane, 1,10-diaminodecane, 1,5-diaminopentane (cadaverine), propane-1,2-diamine, propane-1,3-diamine, 2,2'-oxybis(ethylamine), 3,3'-dimethyl-4,4'-diaminodicyclohexylmethane, 4-ethyl-4-methylamino-1-octylamine, ethyienediamine, hexamethylenediamine, menthenediamine, meta-xylylenediamine (MXDA), reaction products of benzene-1,3-dimethanamine with styrene (Gaskamine® 240), N-(2-aminoethyl)piperazine (AEPIP), neopentanediamine, norbornanediamine, dimethylaminopropylaminopropylamine (DMAPAPA), octamethylenediamine, 4,8-diaminotricyclo[5.2.1.0]decane, trimethylhexamethylenediamine, and piperazine. Preferentially suitable as additional aliphatic, cycloaliphatic or aromatic polyamines are dicyan, dimethyldicyan (DMDC), isophoronediamine (IPDA), diethylenetriamine (DETA), triethylenetetramine (TETA), tetraethylenepentamine (TEPA), 1,3-bis(aminomethyl)cyclohexane (1,3-BAC), bis(p-aminocyclohexyl)methane (PACM), polyetheramines, such as D230 polyetheramine, D400 polyetheramine, D2000 polyetheramine or T403 polyetheramine, 4,9-dioxadodecane-1,12-diamine (DODA), 4,7,10-trioxatridecane-1,13-diamine (TTD), polyaminoamides such as Versamid 140, 4-methylcyclohexane-1,3-diamine, 2-methylcyclohexane-1,3-diamine, mixtures of 4-methylcyclohexane-1,3-diamine and 2-methylcyclohexane-1,3-diamine (MCDA), 1,2-diaminocyclohexane (DACH), 2,4-diamino-3,5-diethyltoluene, 2,6-diamino-3,5-diethyltoluene (DETDA), 1,5-diaminopentane (cadaverine), meta-xylylenediamine (MXDA), reaction products of benzene-1,3-dimethanamine with styrene (Gaskamine® 240), N-(2-aminoethyl)piperazine (AEPIP) and dimethylaminopropylaminopropylamine (DMAPAPA). Examples of suitable additional primary monoamines include dimethylaminopropylamine (DMAPA) and diethylaminopropylamine (DEAPA).

In a particular embodiment, the alkyl-substituted ethyleneamine of the invention accounts for at least 50% by weight, more preferably at least 80% by weight, most preferably at least 90% by weight, based on the total amount of the curing agents in the fiber-matrix composition. In a preferred embodiment, the fiber-matrix composition does not comprise any anhydride curing agents. In a particular embodiment, the fiber-matrix composition does not comprise any further curing agents aside from the alkyl-substituted ethyleneamine of the invention.

A curing agent in the context of the present invention is understood to mean an amino curing agent or an anhydride curing agent. An amino curing agent in the context of the present invention is understood to mean an amine having an NH functionality of ≥2 (accordingly, for example, a primary monoamine has an NH functionality of 2, a primary diamine has an NH functionality of 4 and an amine having 3 secondary amino groups has an NH functionality of 3). An anhydride curing agent in the context of the present invention is understood to mean an intramolecular carboxylic anhydride, for example 4-methyltetrahydrophthalic anhydride.

In the matrix component of the fiber-matrix composition of the invention, preference is given to using the epoxy compounds (epoxy resins including any reactive diluents having epoxy groups) and amino curing agents in an approximately stoichiometric ratio based on the epoxy resins and the NH functionality. Particularly suitable ratios of epoxy groups to NH functionality are, for example, 1:0.8 to 1:1.2. Alternatively, in a particular embodiment of the invention, the epoxy compounds (epoxy resins including any reactive diluents having epoxy groups) and amino curing agents are used in the matrix component of the fiber-matrix composition of the invention in an approximately equivalent ratio, preferably in a ratio in the range from 1:0.8 to 1:1.2 based on the EEW of the epoxy compounds and the $AHEW_{emp}$ of the amino curing agents.

The reinforcing fibers of the invention are preferably glass fibers, carbon fibers, aramid fibers or basalt fibers, or mixtures thereof. Particular preference is given to glass fibers and carbon fibers, especially glass fibers. Glass fibers used are typically fibers of E glass, but also those of R glass, S glass and T glass. The choice of glass type can influence the mechanical properties of the composite materials. According to the invention, the reinforcing fibers are used in the form of single fibers, but preferably in the form of fiber filaments, fiber ravings, fiber mats or combinations thereof. Particular preference is given to using the reinforcing fibers in the form of fiber ravings. The reinforcing fibers may take the form, for example, of short fiber sections having a length of a few mm to cm or of mid-length fiber sections having a length of a few cm to a few m or of long fiber sections having a length in the range of a few m or more. According to the invention, reinforcing fibers are preferably used in the form of continuous fiber filaments, continuous fiber ravings or continuous fiber mats, especially for the pultrusion method or the filament winding method. Continuous fiber filaments, continuous fiber ravings or continuous fiber mats in the context of the invention have a length of at least 10 m, preferably of at least 100 m, especially of at least 200 m.

The fiber-matrix composition of the invention may also comprise further additives, for example inert diluents, curing accelerators, pigments, colorants, fillers, release agents, tougheners, flow agents, antifoams, flame retardants or thickeners. Such additives are typically added in functional amounts, i.e., for example, a pigment is typically added in an amount that leads to the desired color for the composition. The compositions of the invention typically comprise from 0% to 50% by weight, preferably 0% to 20% by weight, for example 2% to 20% by weight, for the entirety of all additives based on the overall fiber-matrix composition. In the context of the present invention, additives are understood to mean all additions to the fiber-matrix composition that are neither epoxy compound nor curing agent (amino curing agent and/or anhydride curing agent) nor reinforcing fiber.

The fiber-matrix composition of the invention preferably comprises matrix component-impregnated reinforcing fibers.

The present invention also relates to the use of the alkyl-substituted ethyleneamine of the invention as curing agent for the production of epoxy resin-based composite materials.

DMDETA may form, for example, as by-product in the preparation of propane-1,2-diamine (PDA) by amination of monoisopropanolamine (MIPOA) with ammonia. Alternatively, it may also be prepared selectively by catalytic alcohol amination of MIPOA with PDA in the presence of hydrogen and optionally also ammonia. Moreover, DMDETA can also be prepared proceeding from 1,2-dichloropropane according to Akhmadeyeva and Zagidullin (edited by Mukmeneva, Materialy Yubileinoi Nauchno-Metodicheskoi Konferentsii "III Kirpichnikovskie Chteniya", Kazan, Russian Federation, Mar. 25-28, 2003, p. 473-475). Other alkyl-substituted ethyleneamines of the invention can be prepared in a corresponding manner.

The invention further provides a method of producing cured composite materials from the fiber-matrix composition of the invention. In the method of the invention for producing such cured composite materials, the fiber-matrix composition of the invention is provided and then cured. For this purpose, the constituents of the matrix component are contacted with one another and mixed, contacted with the reinforcing fibers (impregnation of the reinforcing fibers with the matrix component or mixing (embedding) of the reinforcing fibers in the matrix component), and then cured at a temperature practicable for use. The fiber-matrix composition is preferably provided by impregnating the reinforcing fibers with the matrix component. The curing is preferably effected at a temperature of at least 70° C., more preferably of at least 90° C. The curing can be effected at temperatures of less than 180° C., especially at temperatures of less than 150° C., especially within a temperature range from 70 to 180° C., most preferably within a temperature range from 90 to 150° C. The curing can preferably be effected under standard pressure.

The invention further provides the cured composite material composed of the fiber-matrix composition of the invention, especially composed of matrix component-impregnated reinforcing fibers. More particularly, the invention provides cured composite material obtainable or obtained by curing a fiber-matrix composition of the invention, especially the matrix component-impregnated reinforcing fibers. More particularly, the invention provides cured composite material obtainable or obtained by the method of the invention for producing cured composite material. The composite materials cured in accordance with the invention, or the matrix components thereof, have a comparatively high glass transition temperature Tg.

The invention also provides, as a particularly preferred method of the invention for the production of cured composite materials, for example of rebars, a pultrusion method comprising the following steps:

a. arranging a multitude of reinforcing fibers to form a bundle,
b. pulling the bundle through an impregnating device to impregnate the reinforcing fibers in the bundle with a curable composition, and
c. pulling the bundle of impregnated reinforcing fibers through a heating device in which the bundle is cured at a temperature in the range from 70 to 180° C. to give a cured composite material, wherein the curable composition is the matrix component of the invention. The reinforcing fibers are preferably glass fibers or carbon fibers, especially glass fibers, preferably having a length of at least 1 m, especially of at least 10 m. The reinforcing fibers preferably take the form of continuous fiber filaments, continuous fiber ravings or continuous fiber mats, or combinations thereof. In order to avoid the occurrence of fibers directly at the surface of the bundle, a matrix component-rich surface veil may be added to the bundle. The impregnation device from step b is preferably a bath filled with the curable composition in which the bundle of reinforcing fibers is soaked, or an injection device provided with the curable composition, with which the curable composition is injected under pressure into the bundle on the surface of the reinforcing fibers. In particular, the impregnation device from step b is an injection device provided with the curable composition, with which the curable composition is injected under pressure into the bundle on the surface of the reinforcing fibers. Preference is given to curing the bundle of impregnated reinforcing fibers in the heating device of step c at a temperature in the range from 90 to 150° C. In a particular embodiment of the method, the bundle of reinforcing fibers may be spread out for better impregnation in the impregnation device. In a particular embodiment, the bundle of impregnated reinforcing fibers, during curing in the heating device, may be formed to a specific cross section (for example to a rectangular or circular cross section), such that the cured composite material takes the form of profiles having the specific cross section. Preference is given to conducting the pultrusion method as a continuous process, Impregnation device and heating device in the continuous process are designed such that sufficient impregnation of the reinforcing fibers and sufficient curing are assured at a constant speed at which the bundle of reinforcing fibers is pulled through the devices. Uniform and practicable impregnation requires a sufficiently long pot life of the matrix component. At the same time, rapid curing of the matrix component at the curing temperature of the heating device is important in order to achieve a comparatively short heating zone of the heating device or comparatively high pultrusion speed. A high pultrusion speed is crucial for the productivity of the method. The profiles produced by means of pultrusion methods can be used, for example, as rebars in the construction of concrete structures.

The invention also provides, as a particularly preferred method of the invention for the production of cured composite materials, for example of rebars, a filament winding method comprising the following steps:

a. impregnating one or more reinforcing fibers with a curable composition and then winding the one or more impregnated reinforcing fibers thus obtained onto a winding core to give an uncured composite material, and
b. curing the uncured composite material at a temperature in the range from 70 to 180° C. to give a cured composite material, wherein the curable composition is the matrix component of the invention. The reinforcing fibers are preferably glass fibers or carbon fibers, especially glass fibers, preferably having a length of at least 1 m, especially of at least 10 m. The reinforcing fibers preferably take the form of continuous fiber filaments, continuous fiber rovings or continuous fiber mats, or combinations thereof. The impregnation device from step a is preferably a bath filled with the curable composition in which the one or more reinforcing fibers are soaked. The uncured composite material is preferably cured in step b at a temperature in the range from 90 to 150° C. The winding core may be of conical shape, for example, and be removed from the cured composite material after curing, or may consist, for example, of a material that can be dissolved after the composite material has been cured, or it may remain within the cured composite material. The filament winding method is preferably used for the production of rotationally symmetric components, but it is also possible to wrap cores having more complex shapes and to produce components of correspondingly complex shape. In a particular embodiment, the filament winding method is performed as a continuous process. Uniform and practicable impregnation requires a sufficiently long pot life of the matrix component. At the same time, rapid curing of the matrix component at the curing temperature of the heating device is important in order to achieve comparatively brief curing or comparatively high productivity of the method. The components produced by means of filament winding methods can be used, for example, as rebars in the construction of concrete structures.

By means of the methods of the invention, especially by means of the pultrusion method of the invention and by means of the filament winding method of the invention, it is possible to produce rebars. Such rebars made of the composite material of the invention are particularly weathering-resistant, whereas conventional rebars made of steel are subject to corrosion. The use of such rebars in concrete structures therefore enables the building of particularly long-lived structures.

The invention thus also provides rebars composed of the cured composite material of the invention. More particularly, the invention provides rebars obtainable or obtained by curing matrix component-impregnated reinforcing fibers. The invention especially provides rebars obtainable or obtained by a method of the invention for production of cured composite material, preferably by the pultrusion method of the invention or by the filament winding method of the invention. Such rebars can be produced in any length and thickness; the rebars preferably have lengths in the range from 0.5 to 50 m, especially from 1 to 20 m, and thicknesses of 0.5 to 5 cm, especially of 1 to 3 cm. The cross section of such rebars may have any geometry; it is preferably essentially rectangular or circular. Such rebars preferably have a surface profile, for example one or more grooves or elevations forming a spiral around the rebar, in order to improve securing within the concrete. Such surface profiles can, for example, be machined subsequently into the already cured rebar, or be applied by wrapping with corresponding impregnated reinforcing fiber material prior to curing. Such rebars may also have an additional surface coating, for example of a pure epoxy resin material, in order to additionally protect the reinforcing fibers from weathering, and from chemical and thermal influences, or in order to improve interaction with the concrete.

Further production processes for cured composite materials for which the matrix component of the invention is suitable, as well as the pultrusion method and the filament winding method, include the curing of preimpregnated fibers or fiber weaves (e.g. prepregs) after storage, and the production of composite moldings by means of infusion or injection methods such as vacuum-assisted resin transfer molding (VARTM), resin transfer molding (RTM), and also wet compression methods such as BMC (bulk mold compression) and SMC (sheet mold compression).

The invention further relates to the cured composite material obtainable or obtained by curing the fiber-matrix composition of the invention, or obtainable or obtained by the methods of the invention for production of cured composite materials. The invention also provides moldings (composite moldings) consisting of the cured composite material of the invention.

Pot life can be determined according to standard DIN 16 945 (1989) ("isothermal viscosity profile"), It gives an indication as to the period of time from the mixing of the components within which the reactive resin composition can be handled. For this purpose, at a fixed temperature (for example room temperature (23° C.)), by means of a rheometer (e.g. shear stress-controlled plate-plate rheometer (e.g. MCR 301, Anton Paar) having a plate diameter of, for example, 15 mm and a gap of, for example, 0.25 mm), the progression of viscosity with time is determined until a fixed viscosity limit (for example 6000 mPa*s) has been attained. The pot life is then the time until attainment of this viscosity limit.

The gel time according to standard DIN 16 945 (1989) gives an indication as to the period of time between the addition of the curing agent to the reaction mixture and the transition of the reactive resin composition from the liquid state to the gel state. The temperature plays an important role, and the gel time is therefore determined for a predetermined temperature in each case. Dynamic-mechanical methods, in particular rotational viscometry, make it possible to analyze even small sample quantities in quasi-isothermal fashion and to capture their entire viscosity/stiffness profile. According to standard ASTM D 4473-08 (2016), the point of intersection between the storage modulus G' and the loss modulus G" at which the damping tan δ has a value of 1 is the gel point, and the period of time between addition of the curing agent to the reaction mixture and attainment of the gel point is the gel time. The gel time thus determined can be regarded as a measure of the curing rate.

For determination of the B time, which likewise serves as a measure of the curing rate, according to standard DIN EN ISO 8987 (2005), a sample (for example 0.5 g) of the freshly, produced reactive resin composition is applied to a hot plate (for example an unrecessed plate, for example at 145° C.), and the time until formation of threads (gel point) or until abrupt hardening (curing) is determined.

The glass transition temperature (Tg) can be determined using a differential calorimeter (DSC), for example in accordance with standard ASTM D 3418-15 (2015). This involves heating a very small amount of sample (for example about 10 mg) in an aluminum crucible (for example at 20° C./min) and measuring the heat flow to a reference crucible. This cycle is repeated three times. The glass transition is determined from the second measurement or as the average of the second and third measurements. The evaluation of the Tg step of the heat-flow curve can be determined via the inflection point, according to the half width or according to the midpoint temperature method.

The amine hydrogen equivalent weight (AHEW) can be determined either theoretically or empirically, as described by B. Burton et al (Huntsman, "Epoxy Formulations using Jeffamine Polyetheramines", Apr. 27, 2005, p. 8-11). The theoretically calculated AHEW is defined as the quotient of the molecular weight of the amine divided by the number of available amine hydrogens (for example 2 for every primary amino group plus 1 for every secondary amino group). For IPDA, for example, having a molecular weight of 170.3 g/mol and 2 primary amino groups, i.e. 4 available amine hydrogens, the theoretically calculated AHEW is 170.3/4 g/eq=42.6 g/eq. The determination of the empirical AHEW is based on the assumption that equivalent amounts of epoxy resin and amino curing agent result in a cured epoxy resin characterized by a maximum heat distortion resistance (heat distortion temperature (HDT)) or maximum gas transition temperature (Tg). Therefore, in order to ascertain the empirical AHEW, mixtures of a fixed amount of epoxy resin and a varying amount of the amino curing agent are cured as completely as possible, the respective HDT or Tg thereof is determined, and the characteristics thus ascertained are plotted against the ratio of the starting materials. The empirical AHEW ($AHEW_{emp}$) is defined by the following formula:

$$AHEW_{emp}=(AH_{max}*EEW_{epox})/ER$$

with $AH_{max}$=amount of the amino curing agent at maximum HDT or Tg in grams $EEW_{epox}$=EEW value of the epoxy resin used for the test ER=amount of the epoxy resin used for the test in grams In the context of this invention, $AHEW_{emp}$ means an empirical amine hydrogen equivalent weight based on the determination of a maximum Tg (measured by means of DSC according to standard ASTM D 3418-15 (2015)). The empirical $AHEW_{emp}$ is of particular significance in cases where the theoretically calculated AHEW is unobtainable, for example in the case of mixtures of polymeric amines.

The initial viscosity ("mixed viscosity") of a curable composition, for example the matrix component of the fiber-matrix composition of the invention, can be determined according to standard DIN ISO 3219 (1993) directly after the mixing of the constituents. The mixed viscosity is with the aid of a shear stress-controlled rheometer (e.g. MCR 301 from Anton Paar) with cone-plate arrangement (for example diameter of cone and plate: 50 mm; cone angle: 1°: gap width: 0.1 mm). The measurement temperature has a major influence on the viscosity and curing rate of the curable composition and is therefore a crucial factor in these measurements. Accordingly, the mixed viscosity must be determined at a particular temperature, for example at room temperature (23° C.), in order to be comparable.

The impact resistance of a test specimen composed of cured epoxy resin can be determined by means of the Charpy notched bar impact test according to standard DIN EN ISO 179-1 (2010) at room temperature. High impact resistance corresponds to low brittleness.

EXAMPLES

Example 1a: Preparation of DMDETA from Aminopropanol (MIPOA) and Propanediamine (PDA)

A tubular reactor was charged with 600 ml of Cu catalyst. The catalyst was activated by heating it to a temperature in the range from 180 to 200° C. under a nitrogen stream at standard pressure. Hydrogen was metered into the nitrogen stream under careful control of the exothermicity of the activation. Finally, pure hydrogen was passed over the catalyst at standard pressure and a temperature of 200° C. for a period of 6 h. After the catalyst had been activated, the reactor was put under 200 bar of hydrogen pressure and, at a temperature in the range from 180 to 200° C., a stream of 100 g/h of 1-aminopropan-2-ol (mixed with about 10% 2-aminopropan-2-ol), 200 g/h of propane-1,2-diamine, 80 g/h of $NH_3$ and 100 L (STP)/h of $H_2$ was passed through the reactor. The product stream was expanded to standard pressure and collected. The crude product thus obtained, which comprised about 20% to 30% by weight of DMDETA, was purified by distillation under reduced pressure in order to obtain the DMDETA fraction. This DMDETA fraction had a purity of >99% (for the sum total of all DMDETA isomers) and an isomer ratio (in GC area %) of about 6:87:6 for the isomers of the formulae IIa:IIb:IIc.

Example 1b: Preparation of DMDETA from Aminopropanol (PGA)

A tubular reactor was charged with 800 ml of Co/Ni/Cu catalyst. The catalyst was activated by heating it to a temperature of 280° C. under a hydrogen stream at standard pressure. After the catalyst had been activated, the reactor was put under 200 bar of hydrogen pressure and, at a temperature in the range from 170 to 190° C., a stream of 320 g/h of 1-aminopropan-2-ol (mixed with about 10% 2-aminopropan-2-ol), 200 to 730 g/h of $NH_3$ and 100 L (STP)/h of $H_2$ was passed through the reactor. The product stream was expanded to standard pressure and collected. The crude product thus obtained, which comprised about 5% by weight of DMDETA as well as the main propanediamine (PDA) product, was purified by distillation under reduced pressure in order to obtain the DMDETA fraction. This DMDETA fraction had a purity of >99% (for the sum total of all DMDETA isomers) and an isomer ratio (in GC area %) of about 42:53:4 for the isomers of the formulae IIa:IIb:IIc.

Example 2: Curing of Epoxy Resin with DMDETA

DMDETA mixtures from example 1a or example 1b and epoxy resin (bisphenol A diglycidyl ether, Epilox A19-03, Leuna, EEW: 185 g/mol) according to the amounts stated in table 1 were mixed in a stirrer system (1 min at 2000 rpm), DSC measurements (differential scanning calorimetry) and rheological analyses were performed immediately after mixing. By way of comparison, corresponding compositions comprising IPDA (Baxxodur® EC 201, BASF), diethylenetriamine (DETA, BASF), 4-methyltetrahydrophthalic anhydride (MTHPA, Sigma-Aldrich) in combination with the accelerator 2,4,6-tris(dimethylaminomethyl)phenol (K54, Sigma-Aldrich) or MTHPA in combination with the accelerator 1-methylimidazole (1-MI, BASF) were also examined in the same way.

The DSC analyses of the curing reaction of DMDETA or IPDA, DETA, MTHPA/K54 or MTHPA/1-MI for determination of onset temperature (To), exothermic enthalpy (ΔH) and glass transition temperature (Tg) were conducted according to ASTM D 3418-15 (2015), using the following temperature profile: 0° C.→20 K/min 200° C.→10 min 200° C. The Tg was determined in the second run. The results are collated in table 1.

The rheological measurements for examination of the reactivity profile (pot life and gel time) of the various amino curing agents (IPDA, DETA and DMDETA) and the various anhydride curing agent systems (MTHPA/K54 and MTHPA/1-MI) with the epoxy resin were conducted at different temperatures on a shear stress-controlled plate-plate rheometer (MCR 301, Anton Paar) with a plate diameter of 15 mm and a gap of 0.25 mm. For the pot lives—as a measure of the period of time within which the reactive resin composition can be handled—the time taken for the freshly produced reactive resin composition to reach a viscosity of 6000 mPa*s was measured with rotation of the abovementioned rheometer at room temperature (23° C.). The gel times were determined with oscillation of the abovementioned rheometer at 90° C. or 110° C., with the point of intersection of the loss modulus (G") and storage modulus (G') giving the gel time according to standard ASTM D 4473-08 (2016). The mixed viscosities ($\eta_o$) were measured at room temperature (23° C.) according to standard DIN ISO 3219 (1993) immediately after the components had been mixed, with the aid of a shear stress-controlled rheometer (e.g. MCR 301 from Anton Paar) with cone-plate arrangement (e.g. diameter of cone and plate: 50 mm; cone angle: 1°; gap width: 0.1 mm) For the determination of the B times that likewise serve as a measure of curing rate, samples (about 0.5 g) of the freshly produced reactive resin composition were applied to an unrecessed plate at 145° C. and, according to standard DIN EN ISO 8987 (2005), the time taken to form fibers (gel point) and until abrupt hardening (curing) were determined. The results of the rheological measurements are summarized in table 1.

Immediately after the epoxy resin and amino curing agent or anhydride curing agent system had been mixed, the mixture was degassed at 1 mbar and then cured (8 h at 60° C., then 4 h at 100° C., then 2 h at 160° C.). After curing, the mechanical properties for the cured resin (tensile modulus of elasticity (E-t), tensile strength (σ-M), tensile elongation (ε-M), flexural modulus of elasticity (E-f), flexural strength (σ-fM) and flexural elongation (ε-fM)) were determined at room temperature according to standards ISO 527-2:1993 and ISO 178:2006. The results are likewise collated in table 1. Impact resistance was determined by means of the Charpy notched bar impact test according to standard DIN EN ISO 179-1 (2010) at room temperature. High impact resistance corresponds to low brittleness.

Table 1: Comparison of the curing of epoxy resin with various amino curing agents (inventive: DMDETA; comparative experiments: IPDA and DETA) or with the various anhydride curing agent systems (comparative experiments: MTHPA with K54 and MTHPA with 1-MI)

TABLE 1

Comparison of the epoxy resin with various amino curing agents (inventive: DMDETA; comparative experiments: IPDA and DETA) or with the various anhydride curing agent systems (comparative experiments: MTHPA with K54 and MTHPA with 1-MI)

|  | IPDA | DETA | DMDETA | | MTHPA | |
|---|---|---|---|---|---|---|
|  |  |  | Ex. 1a | Ex. 1b | K54 | 1-MI |
| $AHEW_{emp}$ | 43 | 20.6 | 27 | 27 | — | — |
| Amount of curing agent (g) per 100 g of epoxy resin | 23.2 | 11.1 | 14.6 | 14.7 | 81 | 81 |
| Amount of accelerator (g) per 100 g of epoxy resin | — | — | — | — | 2 | 2 |

TABLE 1-continued

Comparison of the epoxy resin with various amino
curing agents (inventive: DMDETA; comparative experiments:
IPDA and DETA) or with the various anhydride curing agent systems
(comparative experiments: MTHPA with K54 and MTHPA with 1-MI)

|  |  |  | DMDETA | | MTHPA | |
| --- | --- | --- | --- | --- | --- | --- |
|  | IPDA | DETA | Ex. 1a | Ex. 1b | K54 | 1-MI |
| $\eta_o$ (mPas) at 23° C. | 1930 | 1540 | 1435 | 1350 | 2580 | 1400 |
| Pot life (min) at 23° C. | 47 | 31 | 54 | 60 | 854 | 600 |
| Gel time (min) at 90° C. | 18.0 | 6.0 | 11.0 | 11.5 | 24.0 | 30.0 |
| Gel time (min) at 110° C. | 7.5 | 2.6 | 4.6 | 5.0 | 7.0 | 9.4 |
| B time of plate (sec) at 145° C. (gel point) | 130 | 25 | 80 | 80 | 110 | 110 |
| B time of plate (sec) at 145° C. (curing) | 145 | 30 | 90 | 90 | 125 | 125 |
| To (° C.) | 68 | 62 | 66 | 68 | 105 | 103 |
| ΔH (J/g) | 467 | 540 | 487 | 488 | 326 | 370 |
| Tg (° C.) | 164.9 | 136.7 | 161.5 | 161.3 | 126.8 | 137.0 |
| Flexural E-f (MPa) | 2884 | 2865 | 3057 | 3024 | 3251 | 3089 |
| Flexural σ-fM (MPa) | 119.4 | 104 | 116.3 | 116.4 | 141.5 | 134 |
| Flexural ε-fM (%) | 6.08 | 5.9 | 6.09 | 6.10 | 6.1 | 6.1 |
| Tensile E-t (MPa) | 2734 | 2726 | n.d. | 2899 | 3112 | 2951 |
| Tensile σ-M (MPa) | 80.1 | 70.6 | n.d. | 83.2 | 80.4 | 84 |
| Tensile ε-M (%) | 7.8 | 6.2 | n.d. | 7.5 | 5.3 | 5.8 |
| Charpy (kJ/m$^2$) | 38.9 | 22.6 | 26 | 23.8 | 19.2 | 18.7 |

*(n.d.: not determined)

Example 3: Pultrudates with a Matrix Composed of Epoxy Resin and DMDETA

Pultrusion profiles were produced by means of pultrusion methods. For this purpose, continuous glass fibers (E-CR glass; PulStrand® 4100 Type 30; from Owens Corning) were impregnated in a pultrusion apparatus (Px 750-08T; from Pultrex) with a matrix mixture composed of 100 parts epoxy resin (ER 5700, from Leuna Harze, EEW: 180.5), 15 parts DMDETA (from example 1a) and 3 parts separating agent (PAT 0656/3-7, from Würtz), bundled, and cured at a pultrusion speed of 1.1 m/min and a temperature of 160° C. (length of the heating zone: 1 m). As well as these glass fiber-based pultrusion profiles (GF pultrudates), carbon fiber-based pultrusion profiles (CF pultrudates) were produced in a corresponding manner with continuous carbon fibers (Sigrafil C T50-4.0/240-E100, SGL), except using 5 parts of the separating agent and setting a pultrusion speed of 0.4 m/min.

The glass transition temperature (Tg) was measured according to ASTM D 3418-15 (2015) as described for example 2. For this purpose, some material was removed from the pultrudates and ground to powder, the fiber content thereof was removed by means of the density gradient, and the determination of Tg was conducted with the remaining pulverulent resin material. The GF pultrudates achieved a glass transition temperature of 88.7° C., and of 92.1° C. after further curing (6 h at 110° C.). The CF pultrudates achieved a glass transition temperature of 89.1° C.

The pultrudates had a fiber volume content of about 60%.

In a three-point bending test (instrument: Z050 Allround (fin: r=5 mm, support: r=5 mm), from Zwick/Roell) according to standard DIN EN ISG 14125 (2011), flexural modulus of elasticity (E-f), flexural strength (σ-fM) and flexural elongation (ε-fM) were determined, each longitudinally) (0° and transverse (90°) to the alignment of the fibers. In each case, 6 test specimens with dimensions of 3 mm×15 mm×200 mm (measurements in longitudinal orientation) or 5 test specimens with dimensions of 3 mm×15 mm×150 mm (measurements in transverse orientation) were analyzed at a temperature of 23° C., a relative humidity of 50%, a force sensor of 50 kN, a speed of 1%/min and a support width of 120 mm (measurements in longitudinal orientation) or 60 mm (measurements in transverse orientation). The measurements were corrected as required according to the standard for large deflections. The results are collated in table 2.

TABLE 2

Flexural mechanics for GF and CF pultrudates with epoxy resin/DMDETA matrix

|  | Orientation | E-f (GPa) | σ-fM (MPa) | ε-fM (%) |
| --- | --- | --- | --- | --- |
| CF pultrudate | 0° | 140 ± 4 | 1300 ± 200 | 1.0 ± 0.1 |
|  | 90° | 7.7 ± 0.4 | 60 ± 30 | 0.8 ± 0.3 |
| GF pultrudate | 0° | 52 ± 1 | 1350 ± 60 | 2.6 ± 0.1 |
|  | 90° | 14.8 ± 0.6 | 28 ± 2 | 0.20 ± 0.02 |

The interlaminar shear strength (ILSS) of the GF and CF pultrudates was determined by the three-point method according to standard DIN EN ISO 14130 (1998) (instrument: Z050 Allround; from Zwick/Roell; but with a support radius of 3 mm), in each case longitudinally (0°) to the alignment of the fibers. In each case, 6 test specimens having a thickness of 3 mm were analyzed at a temperature of 23° C., a relative humidity of 50% and a force sensor of 50 kN. The results are collated in table 3.

TABLE 3

Interlaminar shear strength (ILSS) for GF and CF pultrudates with epoxy resin/DMDETA matrix

|  | ILSS (MPa) |
| --- | --- |
| CF pultrudate | 72 ± 1 |
| GF bultrudate | 39 ± 3 |

The invention claimed is:

1. A fiber-matrix composition, comprising:
a fiber component consisting of reinforcing fibers, and
a matrix component comprising epoxy resin and curing agent, wherein the curing agent comprises at least one alkyl-substituted ethyleneamine of the formula (I)

$$H_2N\text{-}A\text{-}(NH\text{-}A)_n NH_2 \qquad (I)$$

wherein A is independently an ethylene group of the formula —CHR—CH$_2$— or CH$_2$—CHR—, with R=H, ethyl or methyl, but at least one A of the at least one alkyl-substituted ethyleneamine of the formula (I) is an alkylethylene group of the formula —CHR—CH$_2$— or —CH$_2$—CHR—, with R=ethyl or methyl, and
wherein n=1 to 4.

2. The fiber-matrix composition according to claim 1, wherein A is independently a methylethylene group of the formula —CH(CH$_3$)—CH$_2$— or CH$_2$—CH(CH$_3$)—, and
wherein n=1 to 4.

3. The fiber-matrix composition according to claim 1, wherein the at least one alkyl-substituted ethyleneamine is a dimethyldiethylenetriamine of the formula (II)

$$H_2N\text{-}A\text{-}NH\text{-}A\text{-}NH_2 \qquad (II)$$

wherein A is independently a methylethylene group of the formula —CH(CH$_3$)—CH$_2$— or —CH$_2$—CH(CH$_3$)—.

4. The fiber-matrix composition according to claim 1, wherein the at least one alkyl-substituted ethyleneamine accounts for at least 50% by weight, based on a total amount of curing agents in the fiber-matrix composition.

5. The fiber-matrix composition according to claim 1, wherein the epoxy resin is selected from the group consisting of diglycidyl ether of bisphenol A, diglycidyl ether of bisphenol F, diglycidyl ether of hydrogenated bisphenol A, diglycidyl ether of hydrogenated bisphenol F, and a mixture thereof.

6. The fiber-matrix composition according to claim 5, wherein the at least one alkyl-substituted ethyleneamine is a dimethyldiethylenetriamine of the formula (II)

$$H_2N\text{-}A\text{-}NH\text{-}A\text{-}NH_2 \qquad (II)$$

wherein A is independently a methylethylene group of the formula —CH(CH$_3$)—CH$_2$— or —CH$_2$—CH(CH$_3$)—.

7. The fiber-matrix composition according to claim 6, wherein the reinforcing fibers are glass fibers, carbon fibers, or mixtures thereof.

8. The fiber-matrix composition according to claim 7, wherein the at least one alkyl-substituted ethyleneamine accounts for at least 90% by weight, based on a total amount of curing agents in the fiber-matrix composition, and wherein the fiber-matrix composition comprises at least 50% by weight of the epoxy resin.

9. The fiber-matrix composition according to claim 8, which is cured at a temperature in the range of 70 to 180° C. to form a cured composite material.

10. The fiber-matrix composition according to claim 1, wherein the reinforcing fibers are glass fibers, carbon fibers, or mixtures thereof.

11. The fiber-matrix composition according to claim 1, wherein the reinforcing fibers have been impregnated with the matrix component.

12. A method of producing a cured composite material, the method comprising:
providing and then curing the fiber-matrix composition according to claim 1.

13. The method according to claim 12, wherein the curing is effected at a temperature in the range from 70 to 180° C.

14. The method according to claim 12, wherein the fiber-matrix composition is provided by impregnating the reinforcing fibers with the matrix component.

15. The method according to claim 12, comprising:
a. arranging a multitude of reinforcing fibers to form a bundle,
b. pulling the bundle through an impregnating device to impregnate the reinforcing fibers in the bundle with the matrix component, to give a bundle of impregnated reinforcing fibers, and
c. pulling the bundle of impregnated reinforcing fibers through a heating device in which the bundle of impregnated reinforcing fibers is cured at a temperature in the range from 70 to 180° C., to give a cured composite material.

16. The method according to claim 12, comprising:
a. impregnating one or more reinforcing fibers with the matrix component, to obtain one or more impregnated reinforcing fibers, and then winding the one or more impregnated reinforcing fibers onto a winding core, to give an uncured composite material, and
b. curing the uncured composite material at a temperature in the range from 70 to 180° C., to give a cured composite material.

17. The method according to claim 12, wherein the reinforcing fibers are in the form of continuous fiber filaments, continuous fiber rovings, or continuous fiber mats.

18. A cured composite material obtainable by the method according to claim 12.

19. A molding consisting of the cured composite material according to claim 18.

20. A rebar consisting of the cured composite material according to claim 18.

* * * * *